United States Patent
Nemoto

(10) Patent No.: US 7,525,895 B2
(45) Date of Patent: Apr. 28, 2009

(54) SEMICONDUCTOR INTEGRATED DEVICE

(75) Inventor: Kazuhiko Nemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 428 days.

(21) Appl. No.: 10/541,913

(22) PCT Filed: Dec. 22, 2003

(86) PCT No.: PCT/JP03/16420

§ 371 (c)(1),
(2), (4) Date: Apr. 3, 2006

(87) PCT Pub. No.: WO2004/064051

PCT Pub. Date: Jul. 29, 2004

(65) Prior Publication Data

US 2006/0226432 A1    Oct. 12, 2006

(30) Foreign Application Priority Data

Jan. 14, 2003  (JP) .............................. 2003-005731

(51) Int. Cl.
  *H01L 33/00*  (2006.01)
(52) U.S. Cl. ............................. 369/112.01; 369/112.28; 257/98
(58) Field of Classification Search ............ 369/112.01, 369/112.28; 257/98
See application file for complete search history.

(56) References Cited

U.S. PATENT DOCUMENTS 5,422,206 A * 6/1995 Kamon ............................ 430/5
6,072,607 A * 6/2000 Tajiri et al. .................... 359/15
6,687,272 B2 * 2/2004 Hamasaki et al. ............. 372/36
2002/0015363 A1 * 2/2002 Nemoto ..................... 369/44.12
2003/0031112 A1 * 2/2003 Horimai ..................... 369/244

FOREIGN PATENT DOCUMENTS

| JP | 09-288838 | 11/1997 |
| JP | 10-198999 | 7/1998 |
| JP | 10-320810 | 12/1998 |
| JP | 11-271508 | 10/1999 |
| JP | 2002-260273 | 9/2002 |

OTHER PUBLICATIONS

Japanese Office Action issued on Nov. 13, 2007.
Japanese Office Action issued on May 15, 2007.

* cited by examiner

*Primary Examiner*—Evan Pert
*Assistant Examiner*—Krista Soderholm
(74) *Attorney, Agent, or Firm*—Sonnenschein Nath & Rosenthal LLP

(57) ABSTRACT

To improve reliability in controlling an output of a semiconductor laser. There are provided a prism adhered to the semiconductor substrate, and having a light reflection surface formed with a light reflection film for reflecting a laser beam emitted from the semiconductor laser and a light transmission surface for transmitting a laser beam emitted from the semiconductor laser outside an aperture range of the objective lens; a monitor photoreceptor disposed in an area of the semiconductor substrate where the prism is disposed, and receiving the laser beam transmitted through the light transmission surface of the prism; and a signal detection photoreceptor disposed outside the area of the semiconductor substrate where the prism is disposed, for receiving, as return light, a laser beam reflected at the light reflection surface of the prism and converged upon the record surface of the disk-shaped recording medium via the objective lens.

9 Claims, 7 Drawing Sheets

ID DEVICE

TECHNICAL FIELD

The present invention relates to an integrated semiconductor device. More particularly, the present invention relates to the technical field of improving reliability in controlling an output of a laser beam to be emitted from a semiconductor laser.

BACKGROUND ART

For example, there is an integrated semiconductor device to be mounted on an optical pickup of a disk drive. The integrated semiconductor device of this type has a semiconductor substrate mounted on which are a semiconductor laser, a signal detection photoreceptor and optical elements such as a prism.

Some integrated semiconductor devices have a monitor photoreceptor providing an APC (Automatic Power Control) function of controlling to make constant the light amount of a laser beam to be emitted from a semiconductor laser.

As types of the monitor photoreceptor, there are a rear monitor type, which receives and detects a portion of a small light amount of a rear side laser beam emitted to a rear side opposite to the front side on which side a front side laser beam is emitted toward the record surface of a disk-shaped recording medium, and a front monitor type, which receives and detects a portion of a front side laser beam emitted toward the record surface of a disk-shaped recording medium.

Generally, a reproduction disk drive only for reproducing an information signal recorded in a disk-shaped recording medium can control a light amount of a laser beam emitted from a semiconductor laser by detecting a small amount of the laser beam with the use of a monitor photoreceptor of the rear monitor type.

However, there are cases where the monitor photoreceptor of the rear monitor type cannot be used for some reproduction disk drives of the type, so-called monolithic two-wavelength laser mounting device type in which a light source, a waveguide, a detector element and the like are fabricated on a single substrate, or for recording/reproducing disk drives also for recording an information signal.

For example, in a recording/reproducing disk drive, when an information signal is recorded in a disk-shaped recording medium, it is necessary to precisely control a large output laser beam emitted from a semiconductor laser. However, it is difficult to precisely control a semiconductor laser beam by using the monitor photoreceptor of the rear monitor type because a ratio between a front side laser beam and a rear side laser beam changes with temperature (temperature drift). In the recording/reproducing disk drive of this type, therefore, the semiconductor laser is controlled by using a monitor photoreceptor of the front monitor type, which is not affected by temperature drift.

An example of a conventional semiconductor integrated device having a monitor photoreceptor of the front monitor type is shown in FIG. 7 (for example, refer to Patent Document No. 1).

A semiconductor integrated device a has a semiconductor substrate disposed in a package not shown, and a semiconductor laser d is mounted on the semiconductor substrate b through a submount c.

A prism e is disposed on the semiconductor substrate b, opposing to the semiconductor laser d. The prism e is formed with a first reflection surface f and a second reflection surface g continuous with the lower side of the first reflection surface f. The first reflection surface f is inclined at an angle of about 45° from an optical axis of a laser beam emitted from the semiconductor laser d, and the second reflection surface g is approximately perpendicular to an optical axis of the laser beam emitted from the semiconductor laser d. The first reflection surface f is a half mirror surface, and the second reflection surface g is a total reflection surface.

Signal detection photoreceptors h, h are disposed on the semiconductor substrate b at lower side positions of the prism e.

A monitor photoreceptor i is disposed on the semiconductor substrate b between the submount c and prism e. The surfaces of the semiconductor substrate b and monitor photoreceptor i are coated with a coating made of, for example, silicon dioxide.

In the semiconductor integrated device a constructed as described above, a laser beam emitted from the semiconductor laser d propagates toward the first reflection surface f of the prism e whereat it is reflected to bend its optical path by 90°. The reflected laser beam enters into an objective lens not shown and is converged on a record surface of a disk-shaped recording medium. The laser beam converged upon the record surface of the disk-shaped recording medium becomes a return light which is made incident upon the first reflection surface f of the prism e via the objective lens and transmits through the first reflection surface f and is received with the signal detection photoreceptors h, h.

Upon reception of the laser beam with the signal detection photoreceptors h, h, for example, an information signal recorded in the disk-shaped recording medium is read.

While a laser beam is emitted from the semiconductor laser d, a portion of the laser beam propagates toward the second reflection surface g of the prism e whereat it is reflected and received with the monitor photoreceptor i disposed between the submount c and prism e.

Upon reception of the laser beam with the monitor photoreceptor i, a light amount of received light is detected, and in accordance with this detection result, the semiconductor laser d is controlled so that the light amount of a laser beam to be emitted from the semiconductor laser becomes constant.

The semiconductor integrated device a described above is, however, associated with some problems such that, since the monitor photoreceptor i is exposed in the air, its sensitivity has a large variation because of a variation in the coated layer on the monitor photoreceptor i, and further, it is likely to be influenced by stray light.

Furthermore, both a laser beam reflected at the record surface of a disk-shaped recording medium and a monitor laser beam enter the inside of the prism e, interference of the laser beams occurs and an information signal detection operation and a control operation for an output of the semiconductor laser d are possibly adversely affected.

In order to suppress the above-described sensitivity variation and the stray light influence, there is a conventional semiconductor integrated device in which a monitor photoreceptor is disposed on the semiconductor substrate at the lower side position of a prism (refer to FIG. 1 of Japanese Patent Application Publication No. 2002-260273).

However, a laser beam received with the monitor photoreceptor of this semiconductor integrated device is a laser beam in the aperture region of an objective lens emitted from a semiconductor laser, resulting in a problem such that a coupling efficiency of an optical system is lowered.

Since both a laser beam reflected at the record surface of a disk-shaped recording medium and a monitor laser beam enter the inside of the prism, the above-described problem of interference of the laser beams is still not solved, similar to the above-described integrated semiconductor device a.

It is therefore a task of an integrated semiconductor device of the present invention to improve the reliability of controlling an output of a laser beam to be emitted from a semiconductor laser, and the like.

DISCLOSURE OF THE INVENTION

In order to solve the above-described task, an integrated semiconductor device of the present invention is provided with a prism adhered to a semiconductor substrate and having a light reflection surface formed with a light reflection film for reflecting a laser beam emitted from a semiconductor laser and a light transmission surface for transmitting a laser beam emitted from the semiconductor laser outside an aperture range of the objective lens; a monitor photoreceptor disposed in an area of the semiconductor substrate where the prism is disposed, and receiving the laser beam transmitted through the light transmission surface of the prism; and a signal detection photoreceptor disposed outside the area of the semiconductor substrate where the prism is disposed, for receiving, as return light, a laser beam reflected at the light reflection surface of the prism and converged upon the record surface of the disk-shaped recording medium via the objective lens.

Therefore, in the integrated semiconductor device of the present invention, a light amount in the aperture range of the objective lens increases.

BEST MODE FOR CARRYING OUT THE INVENTION

An embodiment of an integrated semiconductor device according to the present invention will be described hereafter with reference to the accompanying drawings.

An integrated semiconductor device 1 is disposed, for example, on a transport base of an optical pickup mounted on a disk drive. The transport base is moved in a radial direction of a disk-shaped recording medium 200 during recording or reproducing an information signal in or from the recording medium 200. An objective lens driving device having an objective lens 100 (refer to FIG. 1) is disposed on the transport base. The objective lens driving device moves the objective lens 100 in a focusing direction which is a direction departing from and contacting the disk-shaped recording medium 200 and in a tracking direction which is an approximately radial direction of the disk-shaped recording medium 200, in order for a laser beam irradiated to the disk-shaped recording medium 200 via the objective lens 100 to be converged on a record track of the disk-shaped recording medium 200.

A wiring board, e.g., a flexible printed wiring board, connected to a driver circuit is mounted on the transport base, and external electrodes are formed on one end portion of the flexible printed wiring board.

Figure 2:
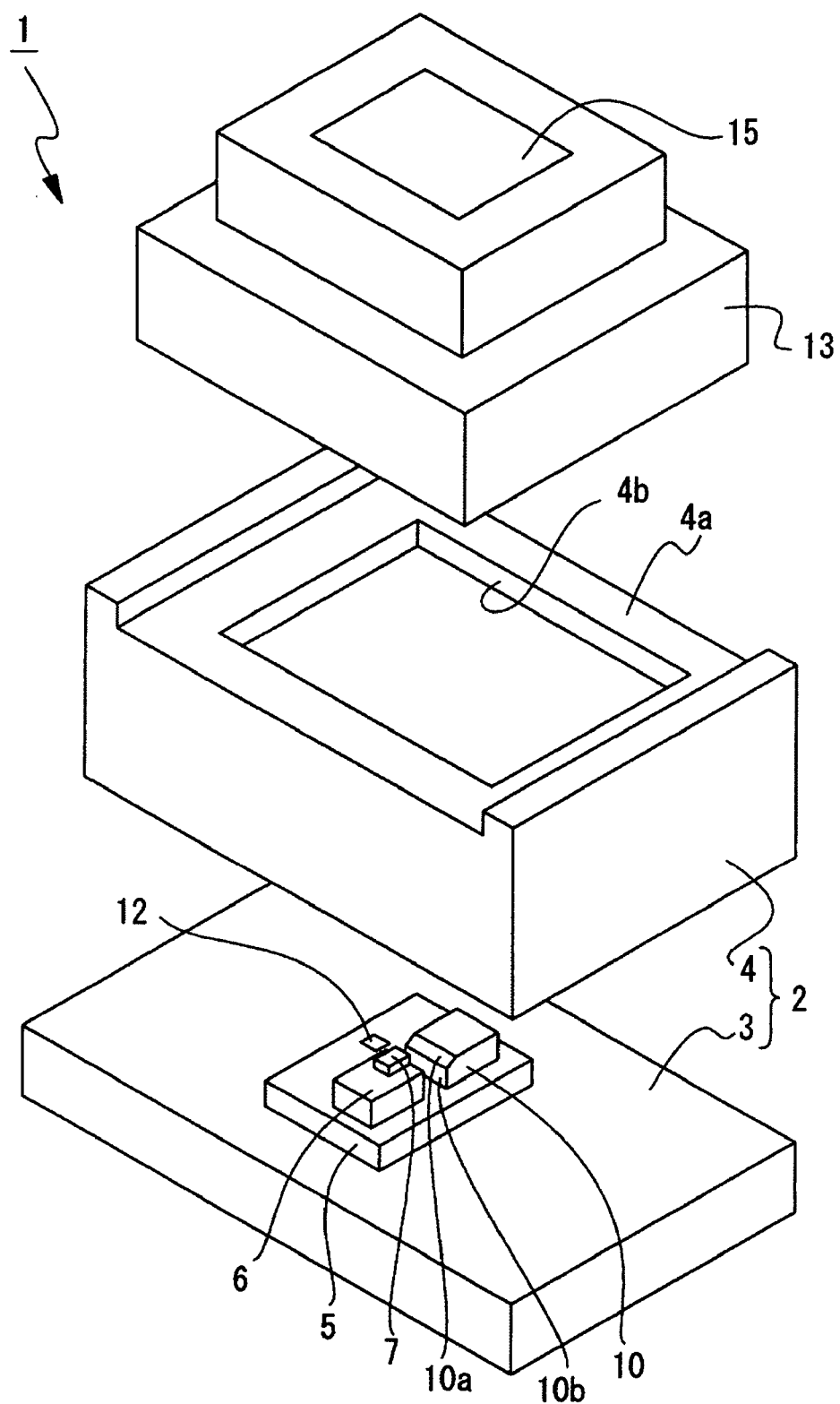
FIG. 2 is an exploded perspective view of an integrated semiconductor device.
Figure 3:
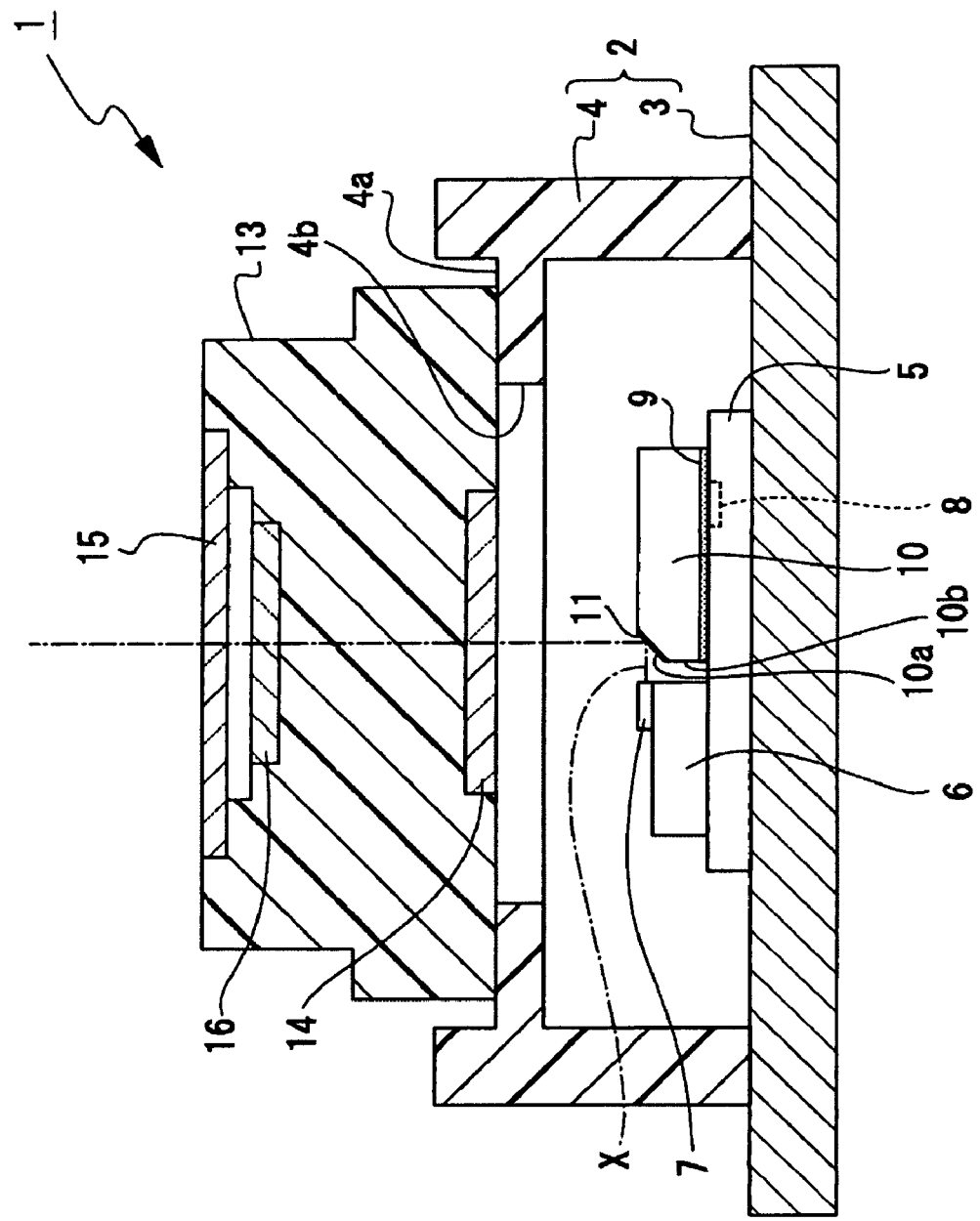
FIG. 3 is an enlarged cross sectional view of an integrated semiconductor device.
Figure 4:
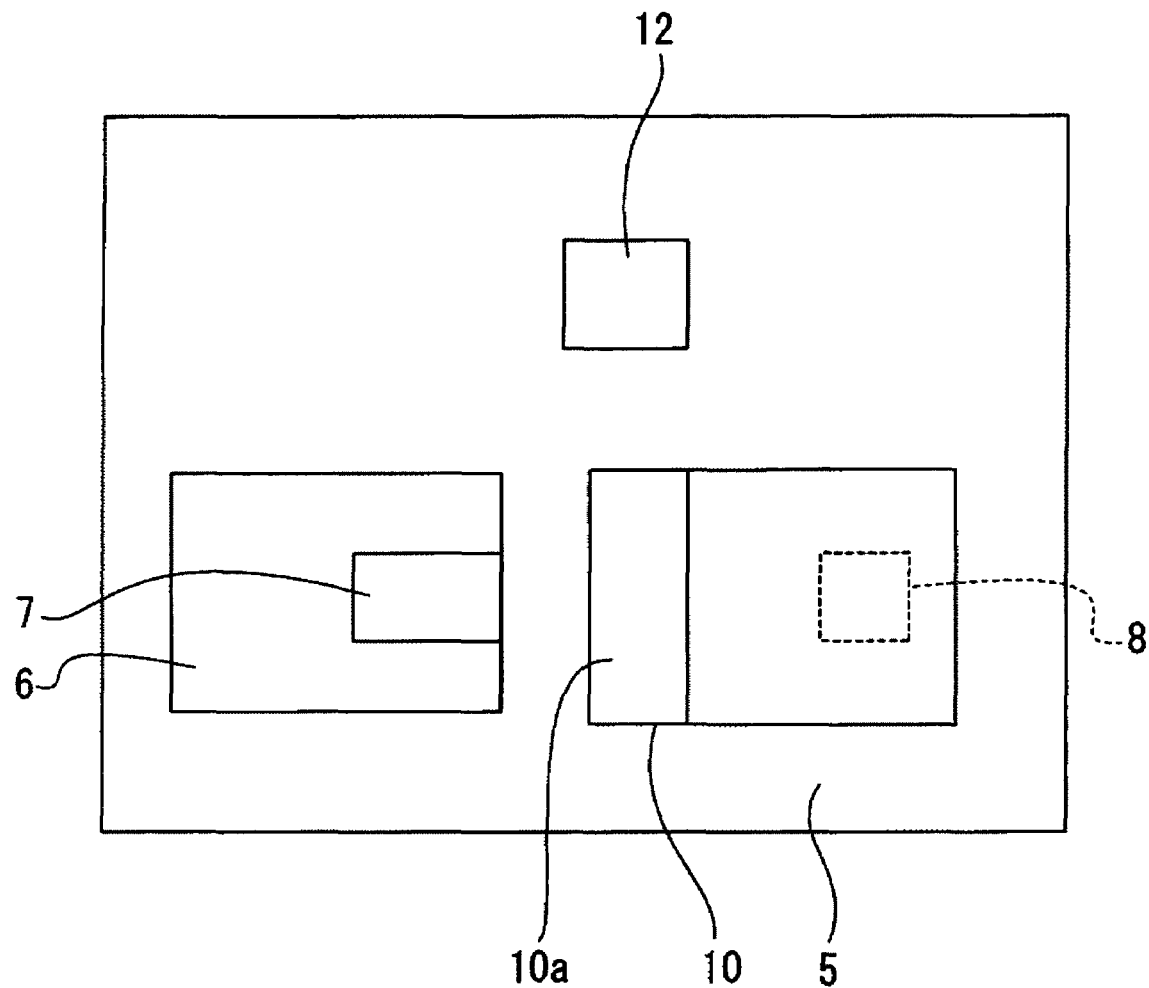
FIG. 4 is an enlarged plan view showing each optical element disposed on a semiconductor substrate.

The semiconductor integrated device 1 is contracted by disposing each predetermined element in a package 2. As shown in FIGS. 2 and 3, the package 2 is constituted of a base body 3 of a plate type made of, for example, ceramic material and a housing 4 made of, for example, resin material.

For example, the housing 4 is formed in a box shape with a downward opening and made of resin having a high thermal insulation performance. A transparent hole 4b is formed through an upper wall 4a of the housing.

Provided on both the upper and lower surfaces of the base body 3 are the semiconductor substrate 5 and electrodes not shown for electrically connecting the above described wiring board (flexible printed wiring board) and the external electrodes.

Provided on both the upper and lower surfaces of the semiconductor substrate 5 are each optical element and an electrode part not shown for electrically connecting to the electrodes of the base body 3.

A submount 6 is disposed on the semiconductor substrate 5 with silver paste, and a semiconductor laser 7 is disposed on the submount 6 (refer to FIGS. 1 to 4). A laser beam is emitted from the semiconductor laser 7 sideways, i.e., in a direction along the surface of the semiconductor substrate 5.

A monitor photoreceptor 8 is mounted on the semiconductor substrate 5, having an APC function of controlling a light amount of a laser beam emitted from the semiconductor laser 7 to be constant.

Figure 5:
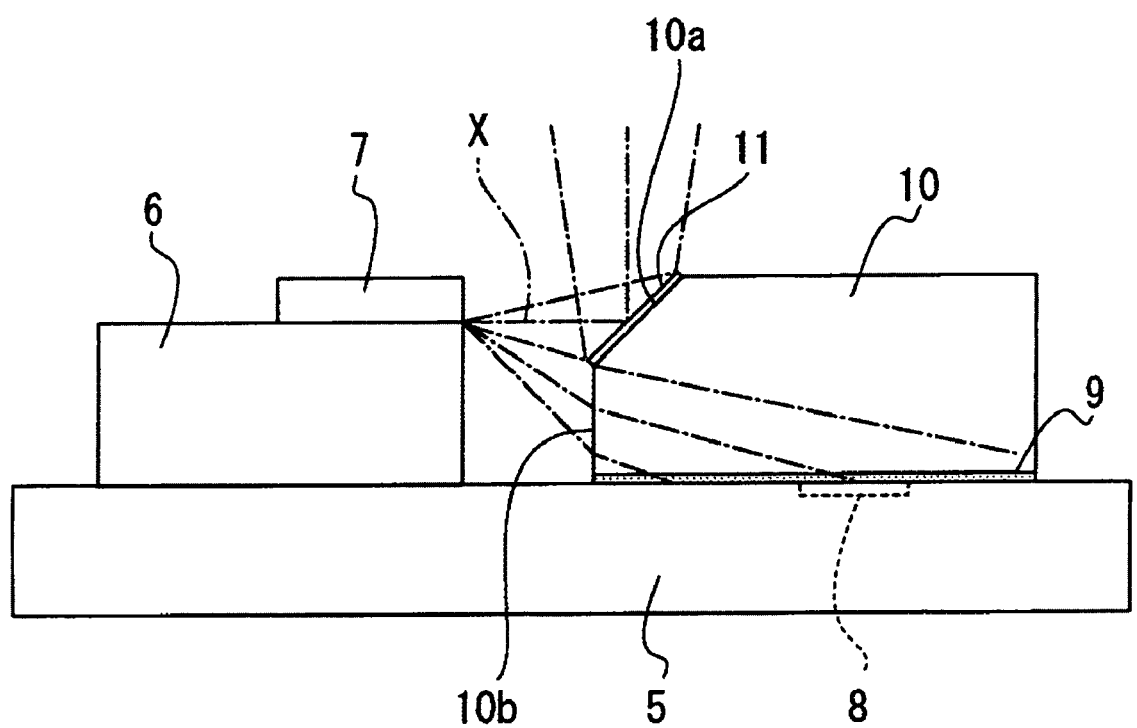
FIG. 5 is an enlarged side view showing a main part.
Figure 6:
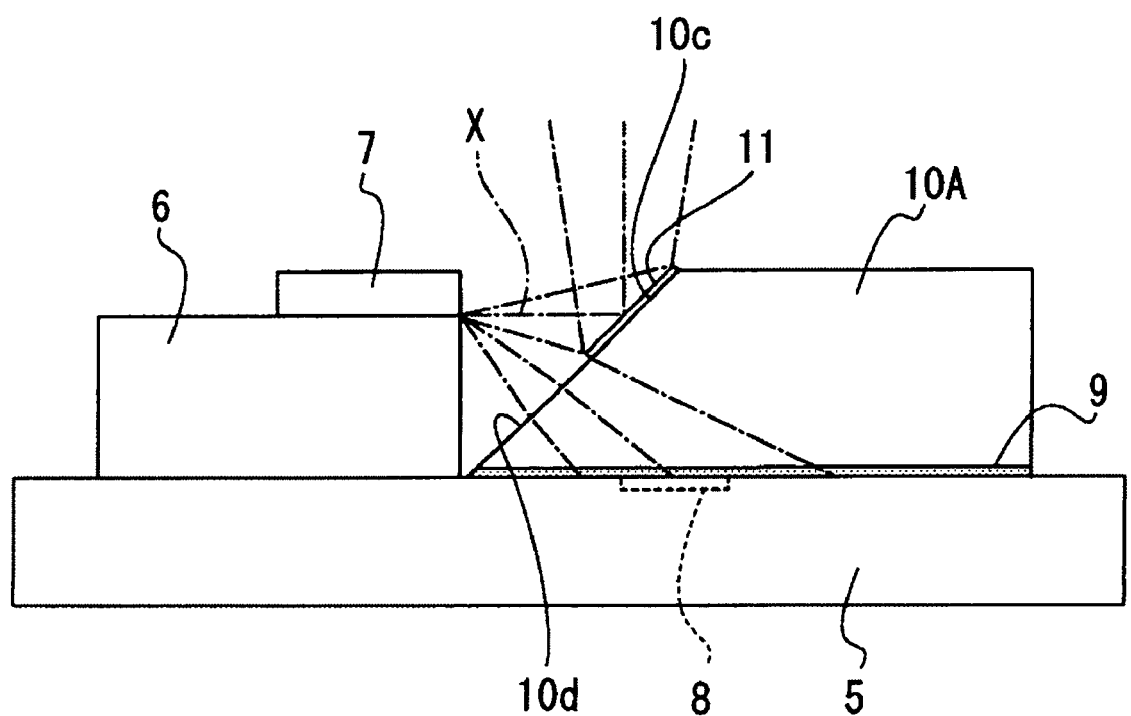
FIG. 6 is an enlarged side view showing a main part using another prism.
Figure 7:
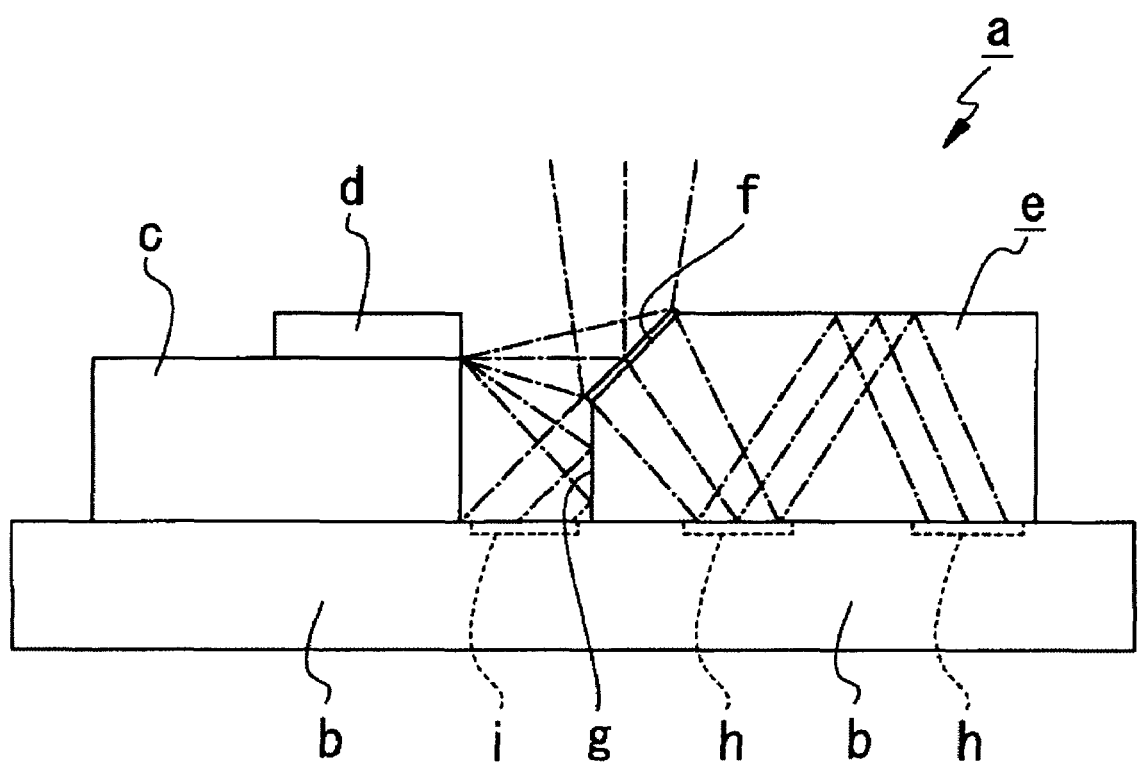
FIG. 7 is an enlarged side view showing an example of a conventional integrated semiconductor device.

As shown in FIG. 5, a prism 10 is mounted on the semiconductor substrate 5 with adhesive 9, e.g., adhesive of an ultraviolet ray curing type. The prism 10 is disposed at the position covering the monitor photoreceptor 8. A light reflection surface 10a and a light transmission surface 10b are each formed on the prism 10.

The light reflection surface 10a is inclined by an angle about 45° from the optical axis X of a laser beam emitted from the semiconductor laser 7, and a light reflection film 11 is formed on the light reflection surface 10a (refer to FIG. 5). For example, as the light reflection film 11, a dielectric multilayer film, a vapor-deposited metal film or the like are used. A laser beam emitted from the semiconductor laser 7 is reflected at the light reflection surface 10a and its optical path is bent by 90°.

The light transmission surface 10b is formed approximately perpendicular to the optical axis X of the laser beam emitted from the semiconductor laser 7 (refer to FIG. 5). Although it is not necessary to perform coating on the light transmission surface 10b in order to ensure transmission, non-reflection coating may be performed in order to prevent reflection. A portion of a laser beam emitted from the semiconductor laser 7 transmits through the light transmission surface 10b, the laser beam transmitted through the light transmission surface 10b being a laser beam outside the aperture region of the objective lens 100.

As described above, the light reflection surface 10a and light transmission surface lob of the prism 10 are formed at different angles from the optical axis X of a laser beam emitted from the semiconductor laser 7. Therefore, the light reflection film 11 can be formed easily only on the light reflection surface 10a so that the working performance of the manufacture process for the prism 10 can be improved.

A signal detection photoreceptor 12 is disposed on the semiconductor substrate 5. For example, the signal detection photoreceptor 12 is positioned at the side position of the submount 6 and prism 10.

The surfaces of the semiconductor substrate 5 and monitor photoreceptor 8 are coated with a coating made of, for example, silicon dioxide.

An element mount block 13 is mounted on the upper wall 4a of the housing 4. For example, the element mount block 13 is made of transparent resin material, a grating 14 is disposed on the bottom surface of the element mount block in a central area, and a quarter wavelength plate 15 is disposed on the top surface thereof in a central area.

A hologram 16 is disposed under the quarter wavelength plate 15 of the element mount block 13 at a position spaced by a predetermined distance from the quarter wavelength plate 15. The hologram 16 is an element having an optical path changing function of changing the optical path of a laser beam and a light separation function of separating a laser beam.

Figure 1:
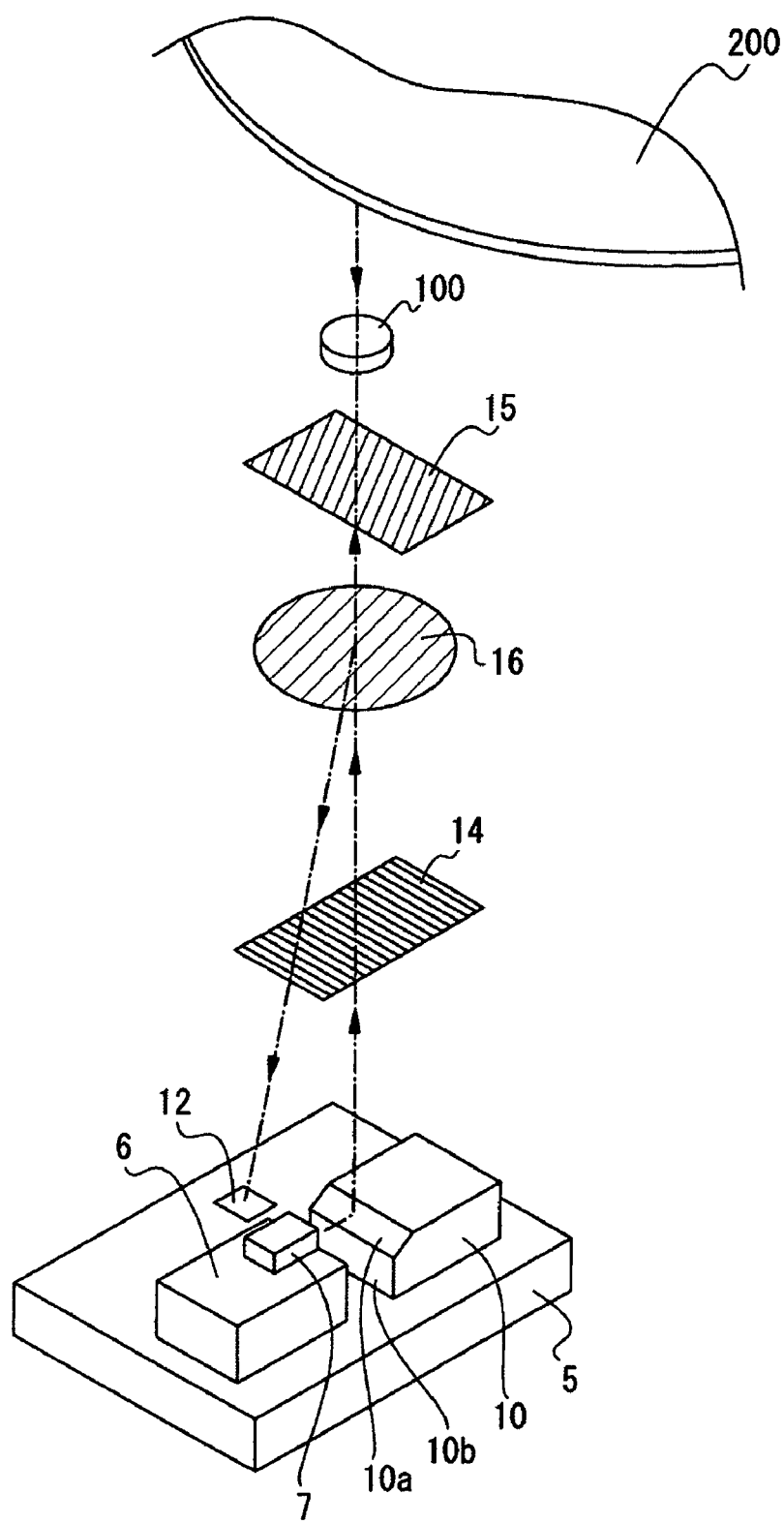
FIG. 1 is a perspective view conceptually showing an optical path of a laser beam according to an embodiment of the present invention, the embodiment being described with reference also to FIGS. 2 to 6.

In the integrated semiconductor device 1 constructed as described above, when a laser beam emitted from the semiconductor laser 7, the emitted laser beam is reflected by the light reflection surface 10a of the prism 10 and its optical path is changed by 90° (refer to FIG. 1). The laser beam whose optical path is changed transmits through the transmission hole 4b of the housing 4, propagates toward the objective lens 100 via the grating 14, hologram 16 and quarter wavelength plate 15, and is converged upon a record track formed on a disk-shaped recording medium 200 by the objective lens 100. The laser beam converged upon the record track of the disk-shaped recording medium 200 is reflected at the record surface and becomes a return light which enters into the hologram 16 via the objective lens 100 and quarter wavelength plate 15. An optical path of the laser beam entered into the hologram 16 is changed to enter into the signal detection photoreceptor 12. For example, during reproduction, reading of an information signal recorded in the disk-shaped recording medium 200 is performed.

While a laser beam is emitted from the semiconductor laser 7 in the manner described above, a portion of the laser beam transmits through the light transmission surface 10b of the prism 10 and enters into the monitor photoreceptor 8. A light amount of the laser beam incident upon the monitor photoreceptor 8 is detected, and in accordance with the detected amount, an output of the semiconductor laser 7 is controlled so that the light amount of a laser beam emitted from the semiconductor laser becomes constant.

As described above, in the integrated semiconductor device 1, the monitor photoreceptor 8 is disposed in an area of the semiconductor substrate 5 where the prism 10 is disposed, and the monitor photoreceptor 8 is covered with the prism 10. Therefore, the monitor photoreceptor 8 is not exposed to the air, and the prism 10 and adhesive 9 can be made of material having approximately the same reflectivity as that of the coating disposed on the monitor photoreceptor 8. A variation in the sensitivity to be caused by a variation in the coating on the monitor photoreceptor 8 is hard to be produced, and since the sensitivity can be stabilized, the reliability of controlling an output of a laser beam to be emitted from the semiconductor layer 7 can be improved.

Since the monitor photoreceptor 8 is disposed in the area of the semiconductor substrate 5 where the prism 10 is disposed, the semiconductor laser 7 and prism 10 can be disposed near to each other and the integrated semiconductor device 1 can be made compact.

Further, since stray light is hard to be irradiated from the outside to the inside of the prism 10, the detection operation of the monitor photoreceptor 8 can be prevented from being adversely affected by stray light.

Furthermore, since the signal detection photoreceptor 12 is disposed outside the area of the semiconductor substrate 5 where the prism 10 is disposed, a laser beam reflected at the record surface of the disk-shaped recording medium 200 is not irradiated to the inside of the prism 10, a monitor laser beam will not interfere with the laser beam reflected at the record surface of the disk-shaped recording medium 200, and a detection operation for the information signal and a control operation for an output of the semiconductor laser 7 will not be adversely affected.

In addition, the monitor laser beam is a laser beam outside the aperture range of the objective lens 100, a coupling efficiency to the optical system can be improved.

In the above description, as an example of the prism, the prism 10 is described, in which the light reflection surface 10a and light transmission surface 10b are formed at different angles from the optical axis X of a laser beam to be emitted from the semiconductor laser 7. Instead, the prism 10 may be replaced by a prism 10A whose light reflection surface 10c and light transmission surface 10d are formed on the same flat plane having an angle of about 45° relative to the optical axis X of a laser beam emitted from the semiconductor laser 7.

By using the prism 10A, the monitor photoreceptor 8 can be disposed near to the semiconductor laser 7 so that the sensitivity of the monitor photoreceptor 8 can be improved further.

A stray light reflection film or a stray light absorption film may be formed on a portion or the whole of the surface other than the light reflection surfaces 10a and 10c and light transmission surfaces 10b and 10d of the above-described prism 10 and prism 10A. For example, as the stray light reflection film, a dielectric multilayer film, a metal vapor-deposited film and the like may be used, and as the stray light absorption film, a chromium oxide film may be used.

By forming the stray light reflection film or stray light absorption film on a portion or the whole of the surface other than the light reflection surfaces 10a and 10c and light transmission surfaces lob and 10d, it becomes possible to reliably prevent incidence of stray light upon the inside of the prism 10 or prism 10A and avoid adverse effects of stray light upon the detection operation of the monitor photoreceptor 8.

The shape and structure of each element of the above-described embodiment is only an illustrative example to be used in the practice of the present invention, and the technical scope of the present invention should not be construed restrictively by these shape and structure.

INDUSTRIAL APPLICABILITY

As apparent from the foregoing description, the integrated semiconductor device of the present invention has a semiconductor substrate and each predetermined optical element including a semiconductor laser disposed on the semiconductor substrate, wherein a laser beam emitted from the semiconductor laser is converged upon a record surface of a disk-shaped recording medium by an objective lens, and is characterized by including: a prism adhered to the semiconductor substrate and having a light reflection surface formed with a light reflection film for reflecting a laser beam emitted from the semiconductor laser and a light transmission surface for transmitting a laser beam emitted from the semiconductor laser outside an aperture range of the objective lens; a monitor photoreceptor disposed in an area of the semiconductor substrate where the prism is disposed, and receiving the laser beam transmitted through the light transmission surface of the prism; and a signal detection photoreceptor disposed outside the area of the semiconductor substrate where the prism is disposed, for receiving, as return light, a laser beam reflected at the light reflection surface of the prism and converged upon the record surface of the disk-shaped recording medium via the objective lens.

Accordingly, since the monitor photoreceptor is covered with the prism, the monitor photoreceptor will be not exposed to the air, and the prism and adhesive for adhering the prism to the semiconductor substrate can be made of material having approximately the same reflectivity as that of the coating disposed on the monitor photoreceptor. A variation in the sensitivity to be caused by a variation in the coating on the monitor photoreceptor is hard to be produced, and since the sensitivity can be stabilized, the reliability of controlling an output of a laser beam to be emitted from the semiconductor layer can be improved.

Since the monitor photoreceptor is disposed in the area of the semiconductor substrate where the prism is disposed, the semiconductor laser and prism can be disposed near to each other and the integrated semiconductor device can be made compact.

Further, since stray light is hard to be irradiated from the outside to the inside of the prism, the detection operation of the monitor photoreceptor can be prevented from being adversely affected by stray light.

Furthermore, since the signal detection photoreceptor is disposed outside the area of the semiconductor substrate where the prism is disposed, a laser beam reflected at the record surface of the disk-shaped recording medium is not irradiated to the inside of the prism, a monitor laser beam will not interfere with the laser beam reflected at the record surface of the disk-shaped recording medium, and an information signal detection operation and a control operation for an output of the semiconductor laser will not be adversely affected.

In addition, the monitor laser beam is a laser beam outside the aperture range of the objective lens, a coupling efficiency to the optical system can be improved.

In the invention described in claim 2, the light transmission surface of the prism is formed approximately perpendicular to the optical axis of a laser beam to be emitted from the semiconductor laser, and the light reflection surface of the prism is formed at an angle of about 45° relative to the optical axis of the laser beam to be emitted from the semiconductor laser. Accordingly, a reflection film can be formed easily only on the light reflection surface so that the working performance of the manufacture process for the prism can be improved.

In the invention described in claim 3, the light reflection surface and light transmission surface of the prism are formed on the same flat plane having an angle of about 45° relative to the optical axis X of a laser beam emitted from the semiconductor laser. Accordingly, the monitor photoreceptor can be disposed near to the semiconductor laser so that the sensitivity of the monitor photoreceptor can be improved further.

In the invention described in claims 4 and 5, a stray light reflection film or a stray light absorption film is formed on a portion or the whole of the surface other than the light reflection surface and light transmission surface of the prism. Accordingly, it becomes possible to reliably prevent incidence of stray light upon the inside of the prism and avoid adverse effects of stray light upon the detection operation of the monitor photoreceptor.

The invention claimed is:

1. An integrated semiconductor device having a semiconductor substrate and one or more predetermined optical elements each of which includes a semiconductor laser disposed on the semiconductor substrate, and a laser beam emitted from the semiconductor laser is converged upon a record surface of a disk-shaped recording medium by an objective lens, said device comprising:
   a prism adhered to the semiconductor substrate, and having a light reflection surface formed with a light reflection film for reflecting a laser beam emitted from a semiconductor laser and a light transmission surface formed approximately perpendicular to an optical axis of the laser beam emitted from the semiconductor laser for transmitting a laser beam emitted from the semiconductor laser outside an aperture range of the objective lens;
   a monitor photoreceptor disposed in an area of the semiconductor substrate where the prism is disposed, and receiving the laser beam transmitted through the light transmission surface of the prism; and
   a signal detection photoreceptor disposed outside the area of the semiconductor substrate where the prism is disposed, for receiving, as return light, a laser beam reflected at the light reflection surface of the prism and converged upon the record surface of the disk-shaped recording medium via the objective lens.

2. An integrated semiconductor device having a semiconductor substrate and one or more predetermined optical elements each of which includes a semiconductor laser disposed on the semiconductor substrate, and a laser beam emitted from the semiconductor laser is converged upon a record surface of a disk-shaped recording medium by an objective lens, said device comprising:
   a prism adhered to the semiconductor substrate, and having a light reflection surface formed with a light reflection film for reflecting a laser beam emitted from a semiconductor laser and a light transmission surfaced formed approximately perpendicular to an optical axis of the laser beam emitted from the semiconductor laser for transmitting a laser beam emitted from the semiconductor laser outside an aperture range of the objective lens;
   a monitor photoreceptor disposed in an area of the semiconductor substrate where the prism is disposed, and receiving the laser beam transmitted through the light transmission surface of the prism; and
   a signal detection photoreceptor disposed outside the area of the semiconductor substrate where the prism is disposed, for receiving, as return light, a laser beam reflected at the light reflection surface of the prism and converged upon the record surface of the disk-shaped recording medium via the objective lens,
   wherein,
      the light reflection surface of the prism is formed at an angle of about 45° relative to the optical axis of the laser beam to be emitted from the semiconductor laser.

3. The integrated semiconductor device according to claim 1, wherein, the light reflection surface and the light transmission surface of the prism are formed on the same flat plane having an angle of about 45° relative to an optical axis of a laser beam to be emitted from the semiconductor laser.

4. The integrated semiconductor device according to claim 1, wherein, a stray light reflection film or a stray light absorption film is formed on at least a portion of a surface other than the light reflection surface and the light transmission surface of the prism.

5. The integrated semiconductor device according to claim 3, wherein, a stray light reflection film or a stray light absorption film is formed on at least a portion of a surface other than the light reflection surface and the light transmission surface of the prism.

6. The integrated semiconductor device according to claim 4, wherein, the light reflection film is a dielectric multilayer film or a vapor-deposited metal film.

7. The integrated semiconductor device according to claim 5, wherein, the light reflection film is a dielectric multilayer film or a vapor-deposited metal film.

8. The integrated semiconductor device according to claim 4, wherein, the stray light absorption film is a chromium oxide film.

9. The integrated semiconductor device according to claim 5, wherein, the stray light absorption film is a chromium oxide film.

* * * * *